(12) United States Patent
Boger

(10) Patent No.: US 6,880,579 B2
(45) Date of Patent: Apr. 19, 2005

(54) NOISE REDUCTION DEVICE FOR FLUID FLOW SYSTEMS

(75) Inventor: Henry W. Boger, Foxboro, MA (US)

(73) Assignee: Dresser, Inc., Addison, TX (US)

(*) Notice: Subject to any disclaimer, the term of this patent is extended or adjusted under 35 U.S.C. 154(b) by 0 days.

(21) Appl. No.: 10/899,254

(22) Filed: Jul. 26, 2004

(65) Prior Publication Data

US 2004/0262553 A1 Dec. 30, 2004

Related U.S. Application Data

(63) Continuation of application No. 10/104,447, filed on Mar. 22, 2002, now Pat. No. 6,807,986.

(51) Int. Cl.[7] .............................................. F16K 47/00
(52) U.S. Cl. ...................... 138/44; 251/118; 239/461; 239/590.3
(58) Field of Search ..................... 138/44, 42; 251/118; 222/564; 239/590.3, 461, 553.3, 553, 590

(56) References Cited

U.S. PATENT DOCUMENTS

| | | | |
|---|---|---|---|
| 1,144,306 A | 6/1915 | Mock | 251/127 |
| 3,665,965 A | 5/1972 | Baumann | 138/42 |
| 3,840,051 A | * 10/1974 | Akashi et al. | 138/37 |
| 4,007,908 A | 2/1977 | Smagghe et al. | 251/127 |
| 4,212,321 A | 7/1980 | Hulsey | 137/625.32 |
| 4,295,493 A | 10/1981 | Bey | 138/43 |
| 4,364,415 A | 12/1982 | Polon | 137/625.32 |
| 4,402,485 A | 9/1983 | Fagerlund | 251/118 |
| 4,479,510 A | 10/1984 | Bey | 137/625.31 |

(Continued)

FOREIGN PATENT DOCUMENTS

| | | |
|---|---|---|
| CH | 237241 | 8/1945 |
| DE | 1 200 688 | 9/1965 |
| DE | 23 52 370 | 4/1975 |
| DE | 24 02 774 | 7/1975 |
| DE | 196 15 888 | 11/1997 |
| DE | 198 41 215 | 4/2000 |
| EP | 0 101 323 | 2/1984 |
| EP | 0 325 846 | 8/1989 |
| EP | 0 869 302 | 10/1998 |
| GB | 520083 | 4/1940 |
| WO | WO 01/31242 | 5/2001 |

OTHER PUBLICATIONS

PCT International Search Report dated Jul. 17, 2003, signed by M. Heneghan.
Neles Q–Ball Standard Product Range, Liquid Phase and Gas Phase/Flashing Phase.
Soundtrim Modulating Low Noise Control Plug Valve, Bulletin V–37, DURCO, Jun. 1987.
Series 61 and 62, High Performance Rotary Valves, INTROL, Kent Process Control, Inc., Sep. 1987.
Neles Control Valves for Gas Transmission and Distribution, Mar. 1989.

*Primary Examiner*—John Bastianelli
(74) *Attorney, Agent, or Firm*—Fish & Richardson, P.C.

(57) ABSTRACT

A noise reduction device for use in a fluid flow system comprises a central section and an outer annular section. The outer annular section is designed to reduce the velocity of an annular fluid flow relative to a central core fluid flow. The central section of the device has a plurality of apertures, while the annular section has upstream apertures communicating with a pressure reduction chamber and downstream apertures. The upstream apertures of the annular section are smaller than, and off set from, the downstream apertures of an annular section to increase the pressure reduction and further reduce the velocity of the fluid flow in an annular section. A method is also described for reducing noise transmissions from a piping system wherein the fluid flow through the piping system is separated into an annular fluid flow and a core fluid flow, and the velocity of the annular fluid flow is reduced relative to the core fluid flow.

36 Claims, 3 Drawing Sheets

U.S. PATENT DOCUMENTS

| | | | |
|---|---|---|---|
| 4,530,375 A | 7/1985 | Bey | 137/625.32 |
| 4,540,025 A | 9/1985 | Ledeen et al. | 137/625.32 |
| 4,610,273 A | 9/1986 | Bey | 137/625.32 |
| 4,691,894 A | 9/1987 | Phötsiä et al. | 251/127 |
| 4,774,984 A | 10/1988 | Peters | 137/625.32 |
| 4,929,088 A | 5/1990 | Smith | 366/337 |
| 5,070,909 A | 12/1991 | Davenport | 137/625.32 |
| 5,180,139 A | 1/1993 | Gethmann et al. | 251/127 |
| 5,193,583 A | 3/1993 | Gethmann et al. | 137/625.32 |
| 5,218,984 A | 6/1993 | Allen | 137/1 |
| 5,287,889 A | 2/1994 | Leinen | 137/625.3 |
| 5,332,004 A | 7/1994 | Gethmann et al. | 137/625.32 |
| 5,392,815 A * | 2/1995 | Stuart | 138/44 |
| 5,400,825 A | 3/1995 | Gethmann et al. | 137/625.32 |
| 5,480,123 A | 1/1996 | Bey | |
| 5,482,249 A | 1/1996 | Schafbuch et al. | 251/118 |
| 5,495,872 A | 3/1996 | Gallagher et al. | 138/44 |
| 5,511,584 A | 4/1996 | Leinen | 137/625.3 |
| 5,590,520 A | 1/1997 | Papamoschou | 60/204 |
| 5,680,889 A | 10/1997 | Boger | 137/625.32 |
| 5,758,689 A | 6/1998 | Leinen | 137/625.32 |
| 5,762,107 A * | 6/1998 | Laws | 138/44 |
| 5,771,929 A | 6/1998 | Boger | 137/625.32 |
| 5,772,178 A | 6/1998 | Bey | 251/127 |
| 5,890,505 A | 4/1999 | Boger | 137/1 |
| 5,904,334 A | 5/1999 | Grunert et al. | |
| 5,988,586 A | 11/1999 | Boger | 251/127 |
| 6,145,544 A * | 11/2000 | Dutertre et al. | 138/42 |
| 6,244,297 B1 | 6/2001 | Baumann | |

\* cited by examiner

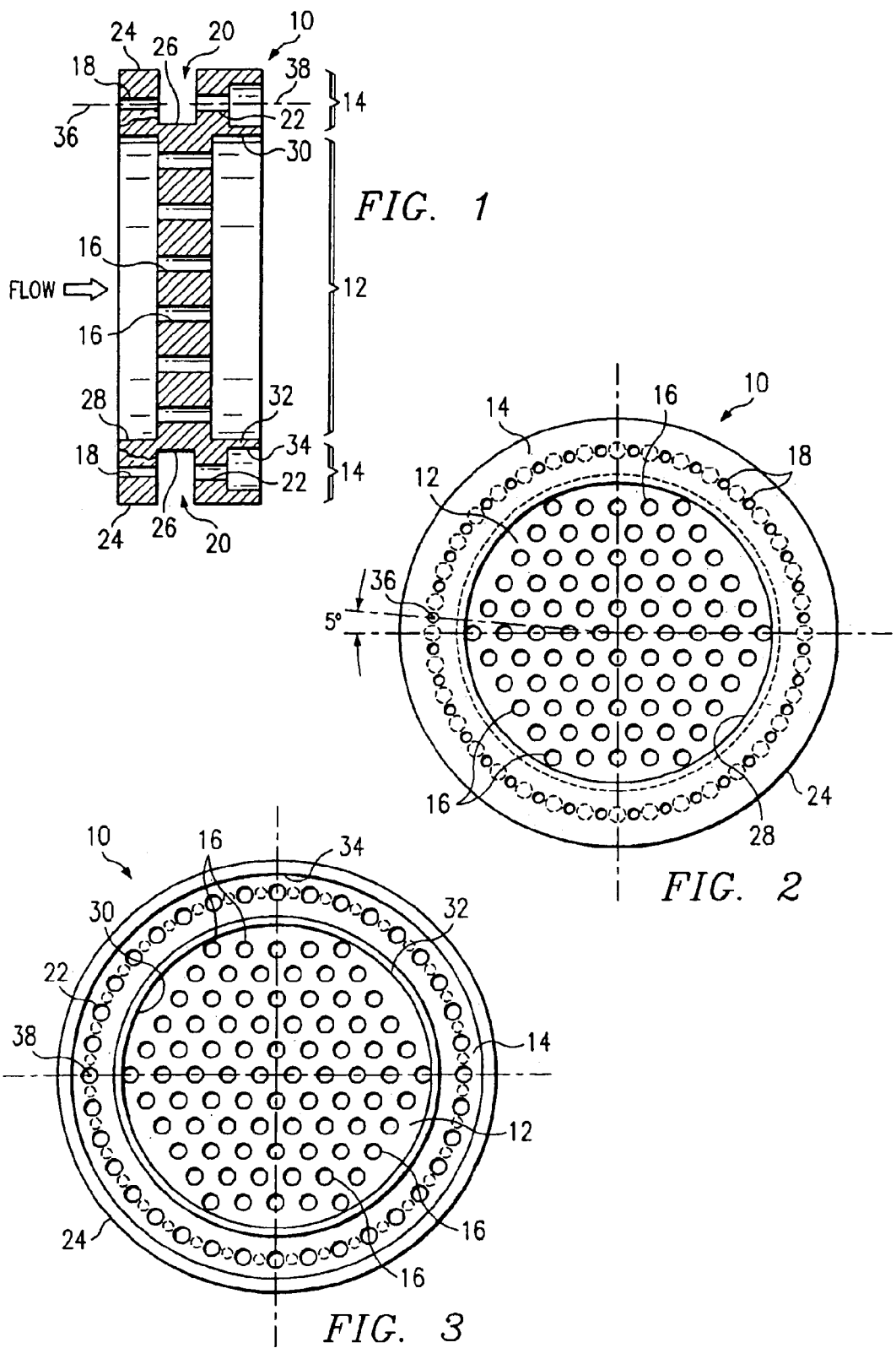

NOISE REDUCTION DEVICE FOR FLUID FLOW SYSTEMS

CROSS-REFERENCE TO RELATED APPLICATIONS

This application is a continuation application and claims the benefit of priority under 35 U.S.C. §120 of U.S. patent application Ser. No. 10/104,447, filed Mar. 22, 2002 now U.S. Pat. No. 6,807,986.

BACKGROUND OF THE INVENTION

1. Technical Field of the Invention

This invention relates to noise reduction devices in fluid flow systems and more particularly to a differential velocity device for use downstream of a valve in a fluid flow system.

2. Description of Related Art

Control valves are used in process industries to control flow of fluids, both liquids and compressible fluids. Aerodynamically generated noise is inherent in the throttling process of gases and vapors. Throttling occurs by opening or closing a selected valve in a fluid flow system.

It is generally accepted that exposure to high levels of noise can damage the hearing of individuals working near fluid flow systems. In the United States, the Occupational Safety and Health Administration (OSHA) limits noise levels of worker exposure for the purpose of hearing conservation. For example, presently noise levels are limited to 90 decibels on the A weighted scale (dBA) for eight hour exposure. Some other countries limit exposure to 85 dBA.

Since noise generation is inherent in the throttling process, many control valves require some method of noise reduction. Often globe type valves are supplied with low noise trim using cages with a multiplicity of small drilled holes.

A more cost effective solution is desirable for moderate service conditions. Specifically some form of noise reduction that can be obtained at moderate cost is desirable for rotary control valves.

SUMMARY OF THE INVENTION

A noise reduction device comprising a central section and an outer annular section is provided. The outer section is designed to reduce the velocity of fluid flow through the device and create an annular fluid flow that has a reduced velocity when compared to the core fluid flow of the system. The preferred method for reducing the velocity of the annular flow is a staged pressure reduction wherein the fluid flow passes through an upstream aperture into a pressure reduction chamber and then through an offset downstream aperture of larger cross sectional area than the upstream aperture. The core flow of the system passes through a plurality of apertures in a central section of the noise reduction device to increase the frequency of the noise in the core flow. The device creates a flow regime with an annular flow surrounding a core flow, the annular flow having a reduced velocity compared to the core flow.

The present invention is intended to provide noise reduction of 15–20 decibels over a wide range of operating conditions. The one piece device is readily machined from wrought material such as austenitic stainless steel. In spite of the drilled holes the thick sections provide an extremely high natural frequency to prevent failure due to flow induced vibration.

BRIEF DESCRIPTION OF THE DRAWINGS

FIG. 1 is a cross sectional side view of the preferred embodiment of current invention.

FIG. 2 is a front view of the device in FIG. 1 from the upstream side.

FIG. 3 is a rear view of the device of FIG. 1 from the downstream side.

DETAILED DESCRIPTION OF THE EXEMPLARY EMBODIMENTS OF THE INVENTION

Figure 4:
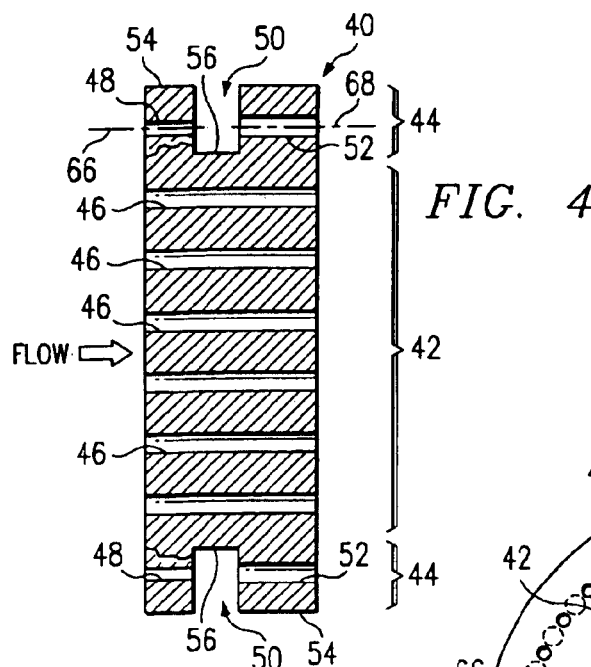
FIG. 4 is a side cross sectional view of a second embodiment of this invention.

Reference is now made to the Drawings wherein like reference numerals denote like or similar parts throughout the Figures.

Figure 7:
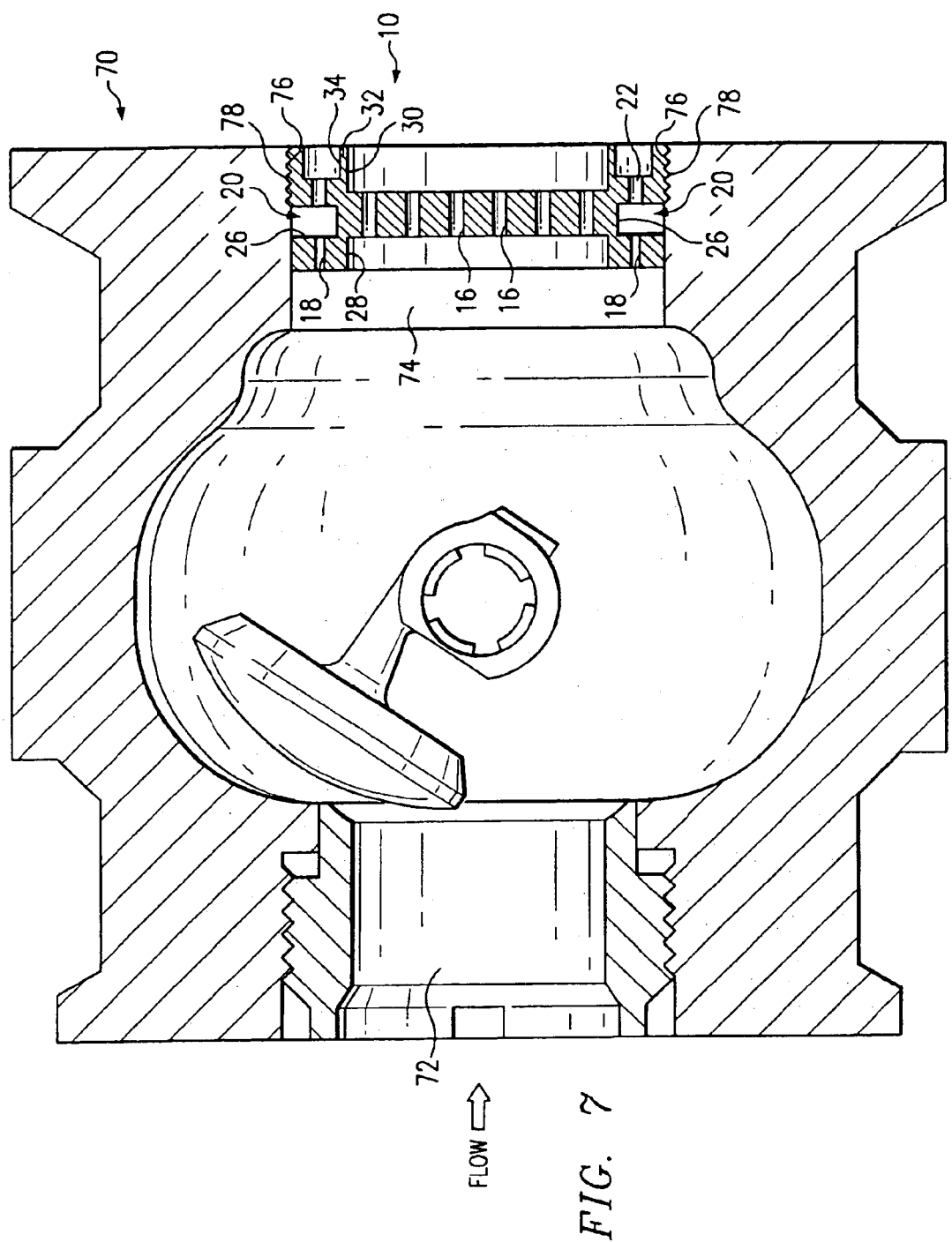
FIG. 7 is a cross sectional top view of the embodiment of a valve system in accordance with the invention.

Referring now to FIGS. 1, 2, and 3, the noise reduction device 10 comprises a circular disc having a central section 12 and an outer annular section 14. The central section 12 contains a plurality of central apertures 16 extending through the disk. The outer annular section 14 has upstream apertures 18 communicating with a pressure reduction chamber 20 which communicates with downstream apertures 22. The noise reduction device 10 has an outer circumferential surface 24 into which a groove 26 is cut around its entire circumference. Groove 26 forms pressure reduction chamber 20 when the device is placed within a fluid flow system, as is illustrated in FIG. 7. Central section 12 in the embodiment shown in FIG. 1 further includes an upstream recess 28 and a downstream recess 30. Outer annular section 14 may have a downstream fin 32 and an annular recess 34. Annular recess 34 communicates with downstream apertures 22 and is separated from downstream recess 30 by downstream fin 32. Recesses 28, 30 and 32 in conjunction with downstream fin 32 enhance the separation between a core fluid flow through the central section 12 and an annular fluid flow through the annular section 14.

Figure 5:
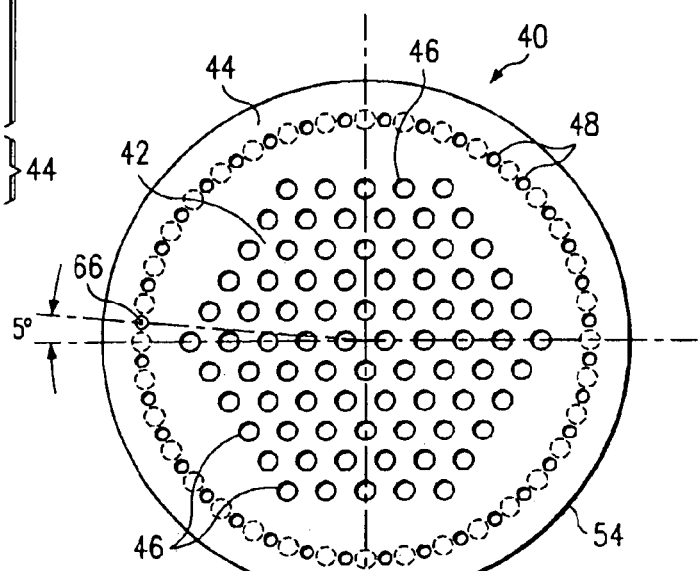
FIG. 5 is a front view of the embodiment at FIG. 4 from the upstream side.
Figure 6:
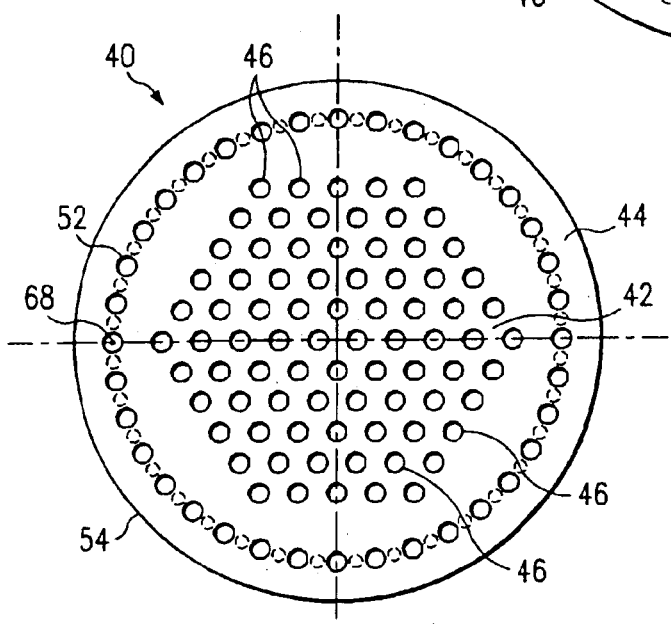
FIG. 6 is a rear view of the embodiment in FIG. 4 from the downstream side.

Each upstream aperture 18 has an axis 36 which extends generally parallel to the flow direction. Each downstream aperture 22 has an axis 38 which extends generally parallel to the flow direction. In the preferred embodiment shown in FIGS. 1, 2, and 3, upstream axes 36 are offset from downstream axes 38 by 5 degrees. The offset between upstream axes and downstream axes enhances the pressure reduction in chamber 20 and is shown in each of the figures. In FIG. 3 aperture 22 is shown while aperture 18 is in shadow, offset from aperture 22 by 5 degrees of rotation. In FIG. 2 aperture 18 is shown while aperture 22 is in shadow, offset from aperture 18 by 5 degrees of rotation. FIG. 1 show aperture 22 as a part of the main cutaway, but aperture 18 is shown as a part of a partial cutaway, indicating that it is not in the same plane as aperture 22. The partial cutaway is used to show the passage of fluid in the annular section 14 first through aperture 18 into chamber 20 and then out of chamber 20 through aperture 22. FIGS. 4, 5, & 6 are drawn in similar fashion to show the same offset.

Referring now to FIGS. 4, 5 and 6, a second embodiment is shown of the invention. Noise reduction device 40 is similar to noise reduction device 10. Noise reduction device 40 has a central section 42 and an outer annular section 44. Central section 42 has central apertures 46. Outer annular section 44 has upstream apertures 48 which communicate with pressure reduction chamber 50 which communicates with downstream apertures 52. Noise reduction device 40 has an outer circumferential surface 54 into which a groove 56 has been cut to form noise reduction chamber 50.

Noise reduction device 40 does not have an upstream recess, downstream recess, downstream fin, or annular recess as shown in noise reduction device 10. Noise reduction device 40 relies on the pressure differential created between the outer section 44 and central section 42 for separation and velocity reduction. Upstream apertures 48 have upstream axes 66 and downstream apertures 52 have downstream axes 68. Upstream axes 66 are off set from downstream axes 68 by 5 degrees as shown in FIGS. 5 and 6.

Noise reduction devices 10 and 40 illustrate two embodiments of the invention. Other embodiments may include selected features of each. For example, a third embodiment may be similar to device 10, but without annular recess 34 and downstream fin 32. Such a third embodiment may be described as similar to device 40, but adding upstream recess 28 and downstream recess 30 from device 10. As will be appreciated by one skilled in the art, many other embodiments are within the scope of this invention.

Referring now to FIG. 7, a valve system 70 is shown with an upstream inlet 72 and a cylindrical downstream outlet 74. The noise reduction device 10 of the present invention is shown as inserted into downstream outlet 74. Downstream outlet 74 may be threaded with outlet threads 76 and noise reduction device 10 may have mating threads 78 on outer surface 24. Threads 78 engage outlet threads 76 to restrain noise reduction device 10 in downstream outlet 74. It will be appreciated by those skilled in the art that other methods of securing noise reduction device 10 in the outlet may be used.

Noise reduction device 10 and noise reduction device 40 are both designed to separate the flow in a fluid flow system into an inner core fluid flow and an outer annular fluid flow. Devices 10 and 40 and other embodiments thereof reduce the pressure in the outer annular fluid flow in a staged manner and thereby reduce the velocity of outer annular flow relative to inner core flow.

Noise reduction device 10 or 40 achieves a reduction in the noise transmitted to the air surrounding the exterior of a piping system by three identifiable mechanisms. The first mechanism is reduced noise generation in the fluid. The difference in velocity between the annular flow and the core flow reduces aerodynamically generated noise as compared to a device that produces a singular flow field. In subsonic flow, the noise reduction is due to the reduced strength of turbulent eddies that create noise. In sonic flow conditions, the noise reduction is due to the reduced interaction of turbulent flow with shock cells. Through these fluid mechanisms the fluid generated noise is reduced.

The second mechanism is through the generation of high frequency noise. Flow through small apertures, such as apertures 16, produces high frequency noise. Pipe wall transmission loss is dependent upon the driving frequency. The minimum transmission loss for a particular pipe size and wall thickness, and with a given fluid, is at the lowest coincidence frequency. The lowest region of transmission loss falls between the lowest coincidence frequency and the ring frequency. Flow through small apertures, such as central apertures 16 or 46, produces high frequency noise that is intended to be well above the coincidence and ring frequencies of the downstream piping. The resulting increased transmission loss is very beneficial toward reduction of the perceived noise in the air surrounding the exterior of a piping system.

The third mechanism is the effect of downstream velocity adjacent to the pipe wall. Normally the perceived noise outside the piping increases with increased downstream velocity even with the same internal noise level. The annular flow velocity along the downstream pipe wall is lowered by pressure staging in the noise reduction device 10 or 40. Lower velocity along the downstream pipe wall reduces the downstream velocity effect thereby reducing the perceived noise level.

While the invention has been described and illustrated in at least two embodiments there are modifications that can be made to these embodiments while still remaining within the scope of the attached claims. It will be appreciated by one skilled in the art that all of the apertures in the preferred embodiments are circular, this reflects the easiest known method of manufacturing the preferred embodiments, which is a drilling procedure. The device would work equally well with other shapes of apertures such rectangular apertures, square apertures, oval apertures, hexagonal apertures, etc. It is also noted that the apertures in the central section of the device are arranged hexagonally to create even spacing between apertures. This hexagonal spacing is the preferred method for achieving even spacing between the apertures although other spacings would also work. A further modification within the scope of this invention would be to further adjust the offset between the upstream apertures and the downstream apertures. While the methods, apparatus and system shown and described have been characterized as being preferred embodiments, it will be readily apparent that various changes and modifications can be made therein without departing from the scope of the invention as defined in the following claims.

I claim:

1. A device to reduce noise transmitted from a piping system, said device comprising:
    an inner central section comprising a plurality of apertures on an upstream side of the inner section;
    a surrounding outer section comprising a plurality of apertures on an upstream side of the outer section, the total cross-sectional area of the upstream apertures of the outer section being less than the total cross-sectional area of the upstream apertures of the inner section, the outer section reducing the velocity of a fluid flow relative to said inner section; and
    a chamber in communication with the upstream apertures of the outer section, the chamber adapted to receive flow through the upstream apertures of the outer section, but not flow through the upstream apertures of the inner section.

2. The device of claim 1, wherein:
    said inner section is a circular disc with a plurality of apertures there through.

3. The device of claim 2, wherein:
    said apertures are equally spaced.

4. The device of claim 1, wherein:
    said chamber comprises a pressure drop chamber; and
    said outer section comprises a plurality of apertures on a downstream side of the outer section, the downstream apertures in communication with said pressure drop chamber.

5. The device of claim 4, wherein:
    said upstream apertures have a total cross-sectional area;
    said downstream apertures have a total cross-sectional area; and
    the total cross-sectional area of the upstream apertures is less than the total cross-sectional area of the downstream apertures.

6. The device of claim 4, wherein:

said upstream apertures have axes;

said downstream apertures have axes; and the axes of said upstream apertures are not aligned with the axes of said downstream apertures.

7. The device of claim 4, wherein:

said upstream apertures have a total cross-sectional area and axes;

said downstream apertures have a total cross-sectional area and axes;

the total cross-sectional area of the upstream apertures is less than the total cross-sectional area of the downstream apertures; and the axes of said upstream apertures are not aligned with the axes of said downstream apertures.

8. A noise reduction device for fluid flow systems, the device comprising:

an inner section with a plurality of apertures on an upstream side and a plurality of apertures on a downstream side;

an outer section with a plurality of apertures on an upstream side and a plurality of apertures on a downstream side, the total cross-sectional area of the downstream apertures of the outer section being less than the total cross-sectional area of the downstream apertures of the inner section; and a chamber between the upstream apertures and the downstream apertures of the outer section, the chamber adapted to receive flow through the upstream apertures of the outer section, but not flow through the upstream apertures of the inner section.

9. The device of claim 8, wherein the chamber comprises a pressure reducing chamber, said chamber formed by a groove in a circumferential outer surface of said outer section.

10. The device of claim 8, wherein:

said upstream apertures of the outer section are smaller than said downstream apertures of the outer section.

11. The device of claim 8, wherein:

said upstream apertures of the outer section are offset from said downstream apertures of the outer section.

12. The device of claim 8, wherein:

said upstream apertures of the outer section are smaller than said downstream apertures of the outer section; and said upstream apertures of the outer section are offset from said downstream apertures of the outer section.

13. A method for reducing noise transmitted from a fluid flow system having at least one valve, the method comprising:

separating a fluid flow downstream of the at least one valve into an inner core fluid flow and a surrounding outer annular fluid flow by passing a portion of the fluid flow through a device having a plurality of first apertures through a central portion of the device;

reducing the velocity of said outer annular fluid flow relative to said inner core flow by passing a portion of the fluid flow through a device having a plurality of second apertures disposed annularly, the inner core flow having a larger total cross-sectional area than the outer annular fluid flow; and receiving flow through the second apertures in a chamber that does not receive flow through the first apertures.

14. The method of claim 13, further comprising:

increasing the frequency of noise in the core flow.

15. The method of claim 14, wherein:

the frequency of the noise is increased by passing the core fluid flow fluid through a plurality of apertures.

16. The method of claim 14, wherein:

the reduction of velocity is achieved with a staged pressure reduction in said outer annular flow.

17. The method of claim 13, wherein:

said separating and said reducing are achieved by passing said fluid flow through a disc having an inner core section and an outer annular section.

18. The method of claim 17 wherein:

said reducing is achieved by a staged pressure reduction in the outer annular section of the disc.

19. A fluid flow system comprising:

a valve with an upstream inlet and a downstream outlet;

a fluid flow from said upstream inlet through said downstream outlet with a certain velocity; and a noise reduction device disposed in the downstream outlet, said noise reduction device having an inner section and an annular outer section, the outer section reducing the velocity of the fluid flow to form a slower annular fluid flow and having a total flow cross-sectional area less than the total flow cross-sectional area of the inner section, the annular fluid flow being received in a chamber that does not receive the inner fluid flow.

20. The device of claim 19, wherein:

said inner section has a plurality of apertures.

21. The device of claim 20, wherein:

said apertures are equally spaced.

22. The device of claim 19, wherein:

said outer section comprises:

a plurality of apertures on an upstream side of the device;

a pressure drop chamber in communication with said upstream apertures; and a plurality of apertures on a downstream side of the device, the downstream apertures in communication with said pressure drop chamber.

23. The device of claim 22, wherein:

said upstream apertures have a total cross-sectional area;

said downstream apertures have a total cross-sectional area; and the total cross-sectional area of the upstream apertures is less than the total cross-sectional area of the downstream apertures.

24. The device of claim 22, wherein:

said upstream apertures have axes;

said downstream apertures have axes; and the axes of said upstream apertures are not aligned with the axes of said downstream apertures.

25. The device of claim 24, wherein:

said upstream apertures have a total cross-sectional area and axes;

said downstream apertures have a total cross-sectional area and axes;

the total cross-sectional area of the upstream apertures is less than the total cross-sectional area of the downstream apertures; and the axes of said upstream apertures are not aligned with the axes of said downstream apertures.

26. The device of claim 1, wherein:

the inner section comprises a plurality of apertures on a downstream side of the inner section; and the outer section comprises a plurality of apertures on a downstream side of the outer section.

27. The device of claim 26, further comprising:

a fin downstream of the downstream apertures of the inner section and of the downstream apertures of the outer section and between the inner section and the outer section, the fin facilitating separation between fluid flow from the inner section and fluid flow from the outer section.

28. The device of claim 26, wherein the downstream apertures of the inner section are upstream of the downstream apertures of the outer section.

29. The device of claim 26, wherein the downstream apertures of the inner section are downstream of the downstream apertures of the outer section.

30. The device of claim 8, further comprising:

a fin downstream of the downstream apertures of the inner section and of the downstream apertures of the outer section and between the inner section and the outer section, the fin facilitating separation between fluid flow from the inner section and fluid flow from the outer section.

31. The device of claim 8, wherein the downstream apertures of the inner section are upstream of the downstream apertures of the outer section.

32. The device of claim 8, wherein the downstream apertures of the inner section are downstream of the downstream apertures of the outer section.

33. The device of claim 19, wherein:

the inner section comprises a plurality of apertures on a downstream side of the inner section; and the outer section comprises a plurality of apertures on a downstream side of the outer section.

34. The device of claim 33, further comprising:

a fin downstream of the downstream apertures of the inner section and of the downstream apertures of the outer section and between the inner section and the outer section, the fin facilitating separation between fluid flow from the inner section and fluid flow from the outer section.

35. The device of claim 33, wherein the downstream apertures of the inner section are upstream of the downstream apertures of the outer section.

36. The device of claim 33, wherein the downstream apertures of the inner section are downstream of the downstream apertures of the outer section.

* * * * *